United States Patent Office 3,442,157
Patented May 6, 1969

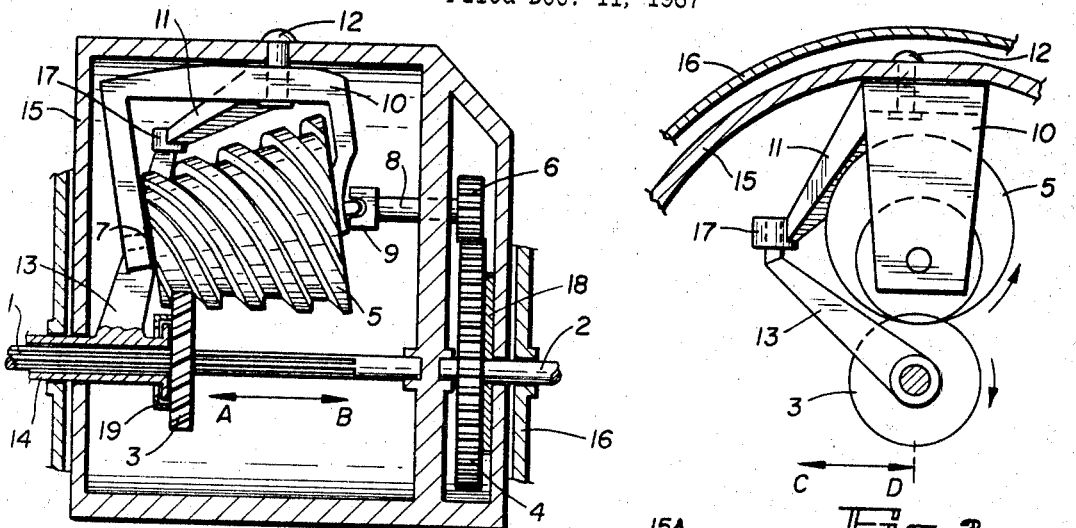
Fig_1, Fig_2, Fig_3, Fig_4, Fig_5, Fig_6, Fig_7
INVENTOR.
HARRY E. NOVINGER

3,442,157
INFINITELY VARIABLE SPEED
GEAR TRANSMISSION
Harry E. Novinger, 1 Parkway Drive,
Englewood, Colo. 80110
Continuation-in-part of application Ser. No. 605,296,
Dec. 28, 1966, which is a continuation-in-part of
application Ser. No. 535,639, Mar. 7, 1966. This
application Dec. 11, 1967, Ser. No. 689,529
Int. Cl. F16h 3/44
U.S. Cl. 74—793                                2 Claims

ABSTRACT OF THE DISCLOSURE

This invention pertains to use of two interconnected planetary gear mechanisms for steplessly varying the speed of an output shaft from neutral rotation to 1:1 ratio relative to an input shaft; the stepless change being governed by a novel type planetary gear in one embodiment, and by hydraulics in another embodiment.

---

The present invention is a continuation in part of application Ser. No. 605,296 filed Dec. 28, 1966 which, in turn, is a continuation in part of Ser. No. 535,639 filed Mar. 7, 1966. The need for a simple, steplessly variable speed gear changing device has been desired in transportation and industry. All prior known variable speed devices are attended by serious drawbacks such as slippage, stepped ratio changes, losses in heat, large size, high cost of manufacture, or general inefficient use of power input.

Therefore, it is the essential object of this invention to avoid these drawbacks, provide a stepless transmission for wide application and provide a speed changing mechanism that will permit the more effective and efficient use of internal combustion engines and gas turbine engines when operated in varying load and power configurations and particularly at full throttle, torque, speed or combination thereof.

Another object of the present invention is to further develop operative embodiments inherent with the earlier applications for patent that are based upon a novel application of progressively varying radius of curvature gear teeth.

Another object of this invention is the application of two methods of utilizing the negative reaction movements of this mechanism with very little modification while keeping with the earlier objects.

Thusly, the present invention provides new and novel planetary gear mechanisms which can be induced to vary their input-output velocity and torque ratios in stepless progression between wide limits while supplying power to the load, even when there is only one torque velocity input, or may be used for braking or connection between an engine and an ultimate load which is subject to arbitrary make or break power flow with shock free engagement.

Further objects, details and advantages may be seen from the following description and accompanying drawings representing exemplary but non-exclusive forms or embodiments of the invention wherein:

FIG. 1 is a longitudinal view of one embodiment with some parts in section and some broken away.

FIG. 2 is a transverse view of the same embodiment partly in section with case broken away.

FIG. 3 is a longitudinal view of a second embodiment with some parts in section and some broken away.

FIG. 4 is a transverse view of the gearing of the FIG. 3 embodiment.

FIG. 5 is an end elevational view of the embodiments of FIGS. 1, 2, 3 and 4 showing the directional rotation of the various parts in a 1:0 ratio input to output status.

FIG. 6 is an end elevational view of the embodiment of FIGS. 3 and 4 showing the directional rotation of the various parts in a 1:1 ratio input to output status.

FIG. 7 is an end elevational view showing the embodiment of FIGS. 1 and 2 in a 1:1 ratio input to output status.

In the drawings, 1 is the input shaft which may be in alignment with an output shaft 2, 3 is an input sun gear in mesh at all times with input planetary gear or gears 5. Gear 5 is a novel gear which will be fully described later. A similar planetary gear arrangement is found in output sun gear 4 which is in mesh with output planetary gear or gears 6. Gear 5 is fixed on input planetary shaft 7 which is fixed to and rotates with an output planetary shaft 8 by universal joint and disconnect device 9.

When it is desired to dispense with the output planetary assembly or to free-wheel gear 5, later explained, 7 and 8 may be disconnected by 9.

Shaft 8 is fixed to gear 6. The remaining parts of a workable planetary system must include a rotatable carrier for each set of planetary gears or one combined carrier for both sets, depending on design so as to maintain engagement of the respective planetary and sun gears. A second input carrier 10 is arcuately and movably supported by pin 12 and input portion of carriers 15. Pin 12 is off-center of carrier 10 to help provide the arcuate movement of gear 5 with respect to gear 3 when arm 11, which is fixed to 10, is moved from position A to position B by arm 13 which is movably fixed to 11 at elbow 17. Arm 13 is fixed to sleeve 14. Shaft 1 is rotatable within 14. 14 may be selectively positioned lengthwise along shaft 1 by hydraulic or other actuating means for the desired control of any negative rotation of carriers 15.

3 is movably fixed by splines to rotate with shaft 1, and is rotatably fixed to 14 by flange ring 19 for controlling the movement of 3 between positions A–B. 3 is movable from A to B for the purpose of engaging or keeping the teeth of 3 and 5 in proper mesh alignment, and which the arcuate movement of 10 and 5 assist because of the increasingly varying tooth angle of gear 5 to its axis. 16 is a case, housing the internal parts of this mechanism. 13 may be a clutch for locking carriers 15 to output shaft 2. This may be desirable when the transmission and power drive system of a mobile vehicle is used as a brake as in an automobile coasting against its engine.

FIG. 2 adds no new parts but does show positions C–D to indicate the arcuate movement through which the small end of 5 approximates; as 14, 13 and 3 move from A toward B, the small end of 5 swings from D toward C. The relative engagement of 5 to 3, when in C position, is better shown in FIG. 7. Both 7 and 8 may be splined compounds shafts or splined to their respective gears as required to compensate for the shift of 10 in its arcuate movement.

The same numbering system has been carried over into FIG. 3 and FIG. 4 because the embodiment of FIGS. 1 and 2 have similar operation to the embodiment in FIGS. 3 and 4. The parts are suffixed however, for clarity. New numbers are added only where new parts are required. Both embodiments have sun gears and planetary gears of different size combination whereby a self-generated torque is created between the gears that effects a negative rotation or torque in the carrier assemblies opposite to that of the input and output shafts. This self-generated torque may also be known as the opposite reaction to the power multiplication between the different size gears.

20 and 21 may be a hydraulic unit, the function of which is to set up a resistance to decrease the negative rotation of the carriers. Exterior control of this resistance may or may not be required depending on the different size combination of gears selected and the selected torque to r.p.m. input power supply. In this embodiment, a fluid coupling demonstrates a form of hydraulic unit; 20 is its input member fixed to carriers 15A but rotatable to 2A, and its output member 21 is fixed to output shaft 2A. 2A has been splined for fixing to 21. The splines have required a special bearing adapter 22 for rotatability of 2A through 15A. The hydraulic unit 20–21 may be fitted between the input shaft and the carriers, in other locations as desired to reduce the negative rotation of the carriers, but in consideration of efficiency it may be located as shown in FIG. 3.

The negative rotation of the carriers 15 or 15A may be seen in FIG. 5 wherein the positive rotation of the input shaft and its sun gear 3 produces a power multiplication between 6 and 4 by virtue that 6 is of sufficiently smaller size to 4 that the positive rotational force between 3 and 5 is overcome by the negative rotational force between 4 and 6. It is to be understood that shaft 2 has an exterior resistance torque against it greater than the internal resistance between the gears of these assemblies. When the different size combination of the four gears is properly made, 6 walks on 4 in a negative rotation to the direction of the input rotation of 3 with the output shaft remaining in neutral. This negative rotation can be gradually decreased by gradually applying resistance to such rotation. When decreasing it, a relative increase in positive rotation of the output shaft results. If this negative rotation is gradually decreased to become a carrier turn of the same direction of rotation as the input and output shafts, it may finally reach 1:1 ratio with the output gear 3 as shown by FIGS. 6 and 7; in decreasing this negative rotation, an infinitely variable speed change will have resulted in the output shaft.

No oil inlets, outlets, seals or bearings are shown for simplicity. Their absence does not prohibit their use.

The operation may be further described. The term negative rotation may be the difference in rotation speed between the carriers and the rotation of the output shaft; if the output shaft is stationary or neutral, it may be the difference between the carriers and the input shaft. It may at times be in an opposite direction to the input or output shafts, static or neutral to earth, and in the same direction to these shafts. The torque necessary to decrease this negative rotation for a given input and output shaft load may be small or large depending on design selection of the combination of gear sizes.

Either the input sun gear or the output planetary gear or both must be smaller than the gears they mesh with. If an adequate power multiplication is not obtained by this difference in size combination, a negative rotation of the planetary gear carriers will not be effected. With proper size combination and a resistance between the gears less than the external torque on the output shaft, a negative rotation of the carriers will result. Thus the output shaft may be steplessly operated from a neutral output to an infinitely variable output rotation by regulating the negative rotation of the carriers.

A reverse may be added following the output shaft by installing another gear on the output shaft and meshing another gear fixed to a reverse shaft. No clutch would be necessary because the reverse engagement would not be made unless the output shaft was in neutral status.

To accomplish a decrease in the negative rotation of the carriers, two embodiments are shown:

One embodiment is a novel type of helical input planetary gear. It pivots in an arcuate movement and increasingly varies its axis to the axis of the input sun gear. Both axes form angles that vary from a parallel position, in which both may be substantially parallel as conventional sun and planetary gears are commonly engineered, to non-parallel positions whereby the end force or thrust of the planetary gear increasingly bears against its carrier overcoming or decreasing its negative rotation. This external planetary gear may have the construction described in the earlier pending patents, being formed to contain curved teeth of progressingly varying radius of curvature and which are of uniform size and equi-distantly spaced between consecutive teeth throughout their lengths. Thus the teeth may mesh with its mating sun gear throughout the length of any of the curved teeth. The surface comprised of teeth further lies between circles of different diameter, the simplest form of shape being a conic section. The curve of the teeth may extend in degrees to each side of a helical angle normally considered the angle of irreversibility. This angle of irreversibility commences at about 55° helix angle to axis, and is herein determined where end thrust overtakes rotational thrust. Thusly, the input sun gear, near this point of engagement with the input planetary gear of this type, commences to lock with the planetary gear and to overcome the negative rotation of their carrier. This breakthrough in gear design also permits the disconnection of the two planetary gear shafts, and when desired negates the requirement of the output planetary gear and output sun gear provided the output shaft is locked to rotate with the input planetary assembly. It may be locked to the assembly in any expedient manner known to the art. In such a configuration, which may be desirable for some uses, only two gears are utilized for the operation; gear 5 freewheels when its axis of rotation is substantially parallel to that of gear 3, but as gear 5 is pivoted about 12 the end thrust of 5 forces carrier 15 and shaft 2 to rotate in the direction of gear 3.

The other embodiment may be a hydraulic unit as earlier mentioned which is used to decrease the negative torque or rotation of the carrier through a transfer of that torque into additional output torque. This transfer of torque is accomplished by the internal hydraulic pressures of such a unit. The employment of hydraulics for this purpose has already been shown herein.

This invention may be further developed within the scope of the attached claims. Accordingly, the foregoing description should be read as merely illustrative of an operative embodiment and not in a strictly limiting sense.

I now claim:

1. A finitely variable speed transmission comprising an input shaft and an output shaft disposed in alignment, input and output sun gears on said shafts, input and output planetary gear shafts, means for movably fixing said planetary gear shafts together, planetary gears of different diameters fixed on said planetary gear shafts and engaging said sun gears, carriers for said planetary gear shafts adapted to turn on the same axis as said sun gears, one of said planetary gears being formed with its surface lying between circles of different diameter, said surface comprised of curved teeth of uniform size, of progressively varying radius of curvature, and equi-distantly spaced between consecutive teeth throughout their lengths, and means for movably supporting said input planetary gear with the curved teeth and said input sun gear in mesh and at increasingly varying angles of engagement in respect to their axes of rotation.

2. The transmission of claim 1 with means for disconnection of said input and said output planetary gear shafts, and means for locking said carriers to said output shaft for rotation in unison.

(References on following page)

References Cited

UNITED STATES PATENTS

| | | | |
|---|---|---|---|
| 1,195,831 | 8/1916 | Marcellot | 74—325 |
| 1,227,985 | 5/1917 | Weigel | 74—793 X |
| 1,242,974 | 10/1917 | Pinckney | 74—688 |
| 1,425,496 | 8/1922 | Huntley | 74—424.5 |
| 1,764,849 | 6/1930 | O'Connor | 74—688 |
| 1,787,466 | 1/1931 | Asmussen | 74—794 |
| 2,559,922 | 7/1951 | Alspaugh | 74—688 X |

FOREIGN PATENTS 307,266  3/1929  Great Britain.

DONLEY J. STOCKING, *Primary Examiner.*

T. C. PERRY, *Assistant Examiner.*

U.S. Cl. X.R.

74—688